United States Patent [19]

Schueli

[11] 3,855,533

[45] Dec. 17, 1974

[54] SYSTEM INCLUDING A TRANSMITTER AND A RECEIVER FOR THE TRANSMISSION OF BINARY SIGNALS LOCATED IN PERIODICAL CLOCK INTERVALS

[75] Inventor: Alexander Alfred Schüeli, Neuhausen, Switzerland

[73] Assignee: U.S. Philips Corporation, New York, N.Y.

[22] Filed: June 1, 1973

[21] Appl. No.: 366,059

[30] Foreign Application Priority Data

June 28, 1972 Netherlands ........................ 7208875

[52] U.S. Cl. ........... 325/60, 178/69.5 R, 179/15 BS

[51] Int. Cl. ............................................ H04h 3/00

[58] Field of Search ...................... 178/66 R, 69.5 R; 179/15 BS, 15 BC; 325/30, 59, 60, 58, 61, 63

[56] References Cited

UNITED STATES PATENTS

| | | | |
|---|---|---|---|
| 3,302,114 | 1/1967 | Den Hertog | 178/66 X |
| 3,311,442 | 3/1967 | DeJager et al. | 179/15 BC |
| 3,740,478 | 6/1973 | Breant et al. | 179/15 BS |

*Primary Examiner*—Benedict V. Safourek
*Attorney, Agent, or Firm*—Frank R. Trifari; Simon L. Cohen

[57] ABSTRACT

A system for carrier synchronization in a multi-phase transmission system of synchronous pulse signals in which the multi-phase modulator at the transmitter end and the multi-phase demodulator at the receiver end are provided with orthogonal modulators. In order to recover the carrier at the recover end in the correct phase position under all circumstances while avoiding phase uncertainties, a clock interval is reserved for the transmission of a synchronizing signal which is transmitted at the transmitter end through a first channel of the orthogonal modulator while simultaneously the second channel of the orthogonal modulator is interrupted. For the local carrier recovery the receiver comprises a phase stabilization channel connected to the output of the modulator in the receiver channel corresponding to the second transmission channel, which stabilization channel incorporates a blocking circuit which for the purpose of phase stabilization is released by a switching signal at the synchronizing intervals originating from a synchronizing interval selector which for the purpose of selecting the synchronizing intervals of lower signal level is fed by the received phasemodulated oscillations.

12 Claims, 6 Drawing Figures

Figure 1:
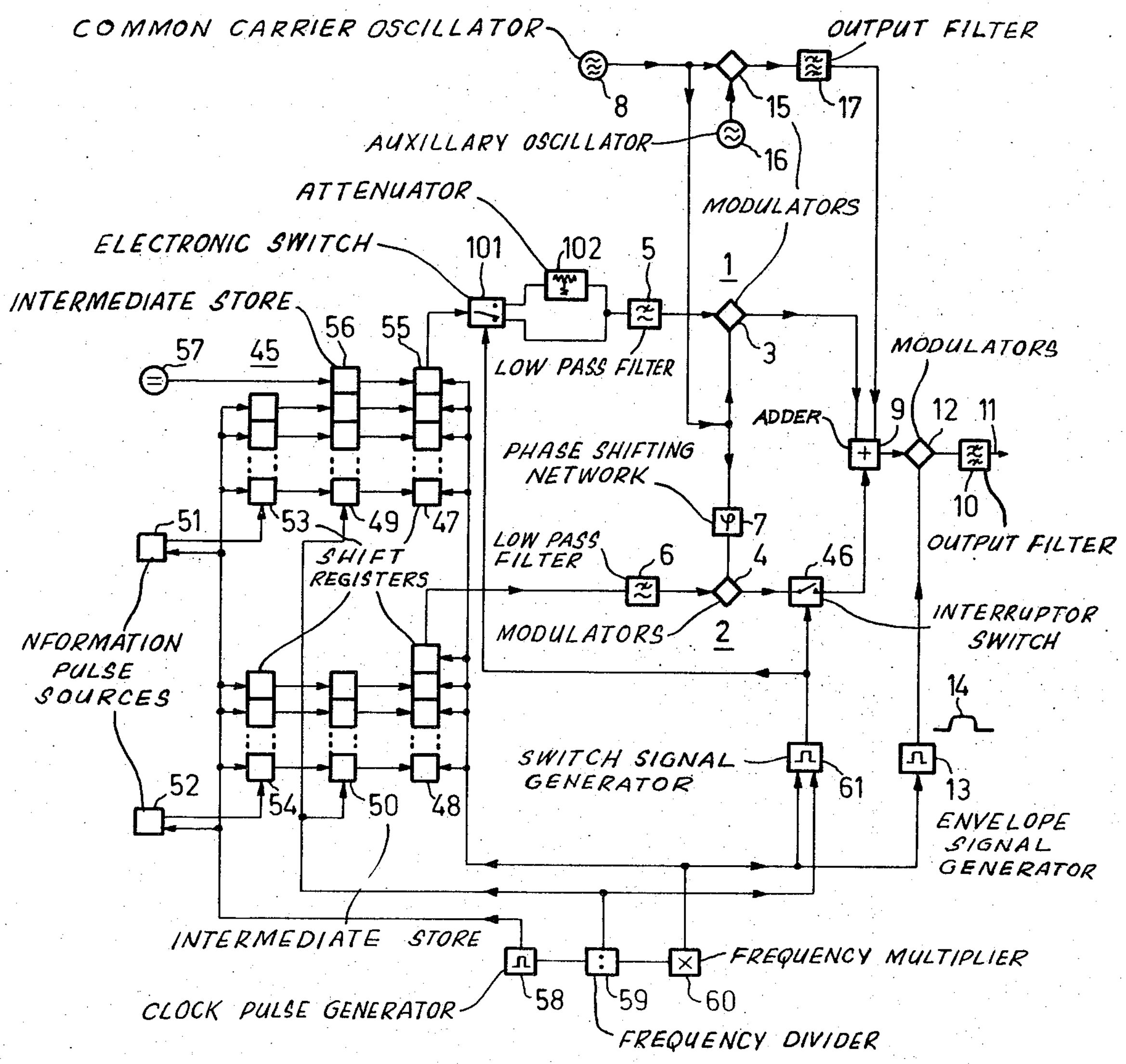

SYSTEM INCLUDING A TRANSMITTER AND A RECEIVER FOR THE TRANSMISSION OF BINARY SIGNALS LOCATED IN PERIODICAL CLOCK INTERVALS

The invention relates to a system including a transmitter and a receiver for the transmission of binary pulse signals located in clock intervals by means of phase modulation, comprising at the transmitter end a phase modulator provided with at least two parallel-arranged channels on the input side, each channel incorporating a modulator, and with a common carrier oscillator which feeds the two modulators with carrier oscillations which are mutually shifted 90° in phase, the outputs of the two modulators being combined in a combination device for the transmission through a transmission path. In this case the receiver includes a phase modulator which is provided with at least two parallel-arranged channels connected on the input side to the transmission path and each incorporating a modulator and with an arrangement for local carrier recovery which is stabilized on the transmitter carrier oscillations for demodulation of the transmitted binary pulse signals and which feeds the two modulators which carrier oscillations which are mutually shifted 90° in phase. The pulse signals derived from each of the outputs of the two modulators being applied through a pulse regenerator to a user. Such systems are used inter alia advantageously for four and eight-phase modulation systems and so-called parallel transmission systems in which a plurality of pulse series with pulses occurring in the rhythm of the same clock frequency are simultaneously transmitted in frequency multiplex on carrier oscillations which mutually differ by the clock frequency which is equal for all pulse series while using a plurality of the above-described phase modulators and phase demodulation.

In such transmission systems correction of the phase shifts in the locally generated carrier oscillations caused by the transmission characteristics of the transmission path is effected at the receiver end of the system for the local carrier recovery. However, the recovered carrier oscillation generally exhibits a phase unreliability as a result of the apparatus used. For example, when using a frequency divider having a division factor of 2, in addition to the correct phase position of the locally generated carrier oscillation a phase position shifted over 180° is possible. This shifted phase position, as a demodulation carrier of the received phase-modulated oscillations, would involve an inversion of the demodulated pulse signals. In order to absolutely obviate the faulty reproduction of the recovered pulse signals as a result of the possibility incorrect phase position of the local carrier oscillation, the use of additional steps is necessary in such transmission systems, for example, in the form of special modulation methods or special pulse codes such as differential phase modulation or change-of-state modulation. However, as a result of these additional steps the possibilities of use are not only limited but the risk of errors is also increased.

An object of the invention is to provide a different conception of a transmission system of the type described in the preamble in which together with a sensitive phase control it is always ensured that the correct phase position of the recovered carrier is established so that the risk of errors is reduced and the limitations in the possibilities of use are obviated.

According to the invention the transmission system is characterized in that a synchronizing interval having a duration of at least one clock interval is reserved for phase stabilization in the rhythym of a periodic cycle period corresponding to an integral number of clock intervals, a synchronizing signal generator being connected at the transmitter end to the modulator in the first transmission channel, which generator applies a predetermined pulse signal as a synchronizing signal to the input of the modulator incorporated in said channel during the synchronizing intervals, the second of the two transmission channels incorporating an interruptor switch which interrupts the second transmission channel at the instants of the synchronizing intervals, while in the receiver the arrangement for local carrier recovery comprises a phase stabilization channel connected to the output of the modulator in the receiver channel corresponding to the second transmission channel and being provided with a blocking arrangement which for the purpose of phase stabilization is released by a switching signal at the synchronizing intervals originating from a synchronizing interval selector which is fed by the received phase-modulated carrier oscillations for selecting the synchronizing intervals of a lower signal level.

The invention and its advantages will now be described in greater detail with reference to the Figures.

Figure 2:
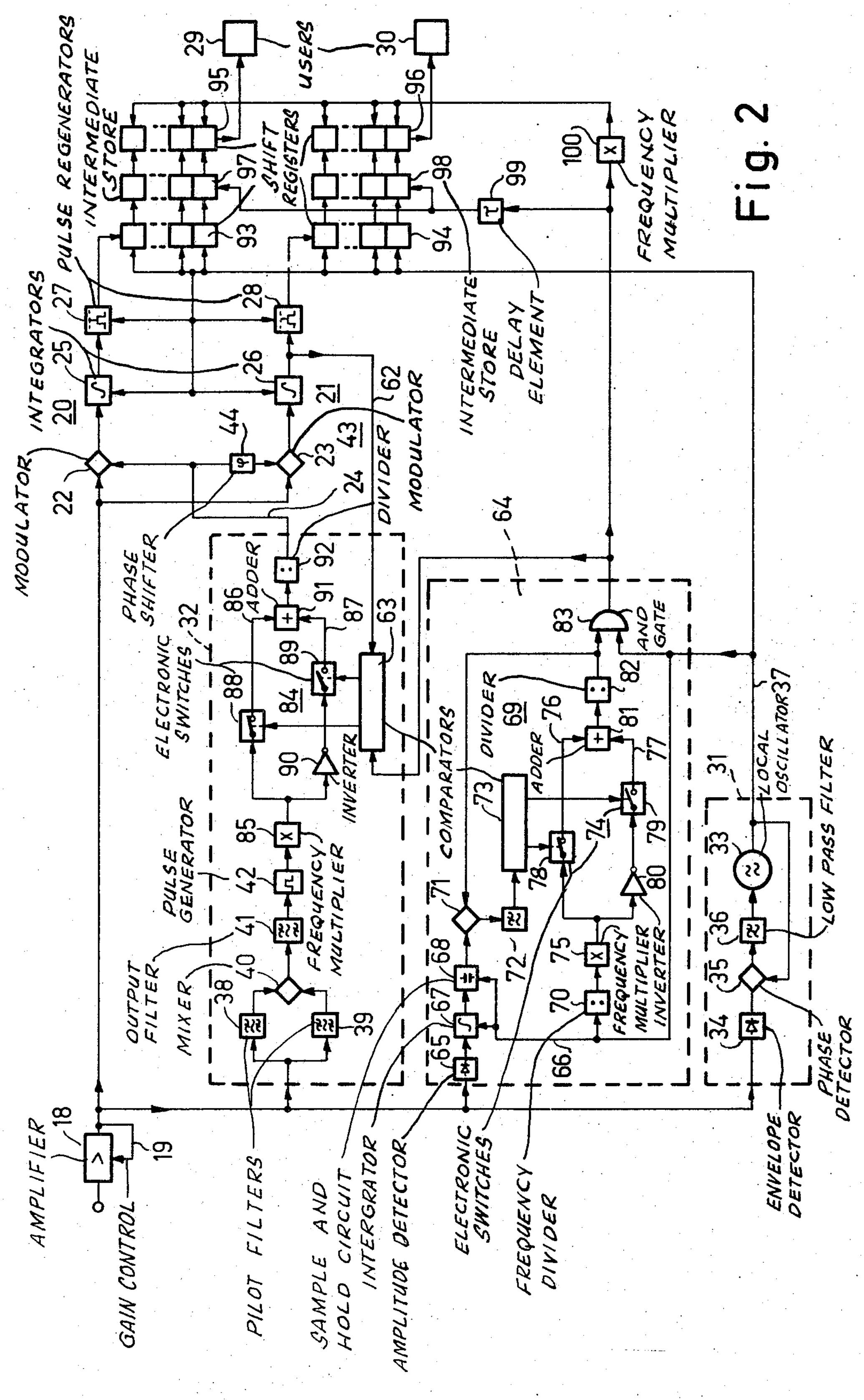
Figure 3A:
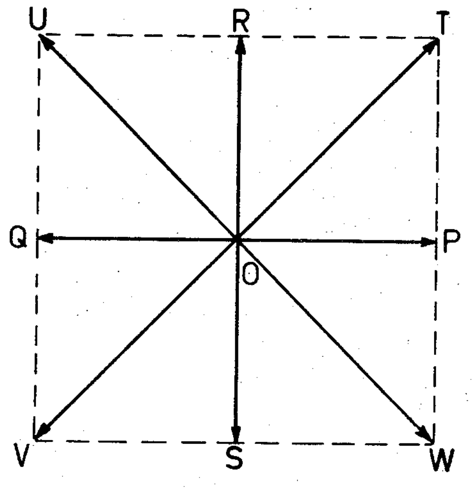
Figure 3B:
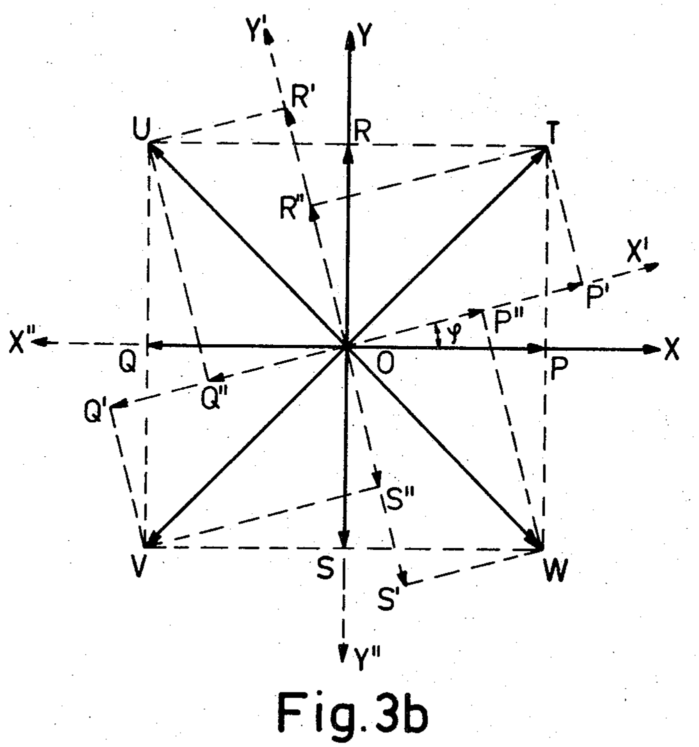

FIGS. 1 and 2 shows a transmitter and a receiver of a transmission system according to the invention while FIGS. 3 and 4 show some vector diagrams to explain the transmitter and receiver shown in FIGS. 1 and 2.

The transmission system, according to the invention provided with a transmitter and a receiver as shown in FIGS. 1 and 2, shows one channel of a parallel transmission system using 25 channels for signal transmission in the band of 370–3,230 Hz and is adapted for four-phase modulation of binary pulse signals occurring in clock intervals which signals are transmitted with a positive or negative polarity. The transmitted pulse signals are denoted for short by +1 and −1 dependent on whether a pulse having a positive polarity or a negative polarity is transmitted.

For four-phase modulation a four-phase modulator is applied in the transmitter according to FIG. 1 which is provided with two channels 1, 2 arranged in parallel on the input side and with modulators 3, 4 of the push-pull type incorporated in each of these channels, while the +1, −1 information pulse signals located in clock intervals corresponding to a pulse rate of for example 110 Baud are applied to the inputs of the modulators 3, 4 through lowpass filters 5, 6 which may be omitted, if desired. A common carrier oscillator 8 of, for example, 1,800 Hz is connected to the two modulators 3, 4 directly and through a 90° phase-shifting network 7, respectively, the output oscillations of the two modulators 3, 4 being combined in a combination device 9 and after possible amplification being applied through an output filter 10 in the band of 300–3,300 Hz to a transmission path 11.

In the system described the pulse signals in the channels 1, 2 are distinguished by the phase position of the oscillations transmitted through the transmission lead 11 and particularly in the vector diagram of FIG. **3*a* the vectors OP and OQ show the output signal from channel 1 according to direction and magnitude in case of a +1 or −1 signal applied thereto and the vectors OR and OS show the signal from channel 2 in case of a +1 or −1 signal applied thereto. In that case it is found that by combination of the vectors OP and OQ with each of the vectors OR and OS the phase-modulated oscillations transmitted through transmission lead 11 can occur in four-phase positions OT, OU, OV and OW which are characteristic of the pulse signals applied to the channels 1, 2.** The vectors OT, OU, OV and OW successively characterize the states where *a* +1, +1, *a* −1, +1, *a* −1, −1 and *a* +1, −1 signal simultaneously occur in the channels 1, 2.

Together with the phase-modulated oscillations thus obtained data of the clock frequency and the carrier frequency are co-transmitted in known manner through the transmission lead in the system shown, which data are utilized at the receiver end for the clock recovery and the carrier recovery.

For recovering the clock frequency this object is achieved by modulating the envelope of the oscillations derived from the combination device 9 in a modulator 12 with a suitable envelope signal from an envelope signal generator 13 synchronized by the clock frequency, for example, of the form shown in the Figure by 14 using sinusoidal transitions so that simultaneously the advantage is obtained that distortion and crosstalk phenomena due to sudden phase changes at the +1, −1 or −1, +1 transitions in the channels 1, 2 are counteracted. For recovering the carrier two pilot signals are co-transmitted on either side of the transmission band which pilot signals are obtained by modulating the carrier oscillation of the common carrier oscillator 8 in a pushpull modulator 15 with the output oscillation of an auxiliary oscillator 16 of, for example, 1,430 Hz. The sum and difference frequencies of 370 and 3,230 Hz obtained by modulation are combined through an output filter 17 in the combination device 9 with the output oscillations of the modulators 3, 4 and are jointly transmitted through the transmission path 11 to the receiver.

In the receiver shown in FIG. 2 the signals received through path 11 are amplified in an input amplifier 18 provided with a diagrammatically shown gain control device 19 having a long time constant of, for example, 100 msec and are applied after amplification to a four-phase demodulator provided with two channels 20, 21 arranged in parallel on the input side and each incorporating modulators 22, 23. While using local carrier oscillations applied through lead 24 in the correct phase position the demodulated output signals are obtained at the outputs of the two modulators 22, 23 which signals are applied in known manner after integration and pulse regeneration in integrators 25, 26 controlled by a local clock signal and pulse regenerators 27, 28 to users 29, 30 for further processing. Both the integrators 25, 26 and the pulse regenerators 27, 28 are of a known type, for example, the system shown employs integrators 25, 26 of the kind as described in U.S. Pat. No. 2,977,417.

Both the local clock signal and the local carrier oscillations are recovered in the described receiver in arrangements for local clock signal recovery 31 and local carrier recovery 32 which are both connected to the output of the input amplifier 18.

To this end a phase control loop is used for the local clock signal recovery and it comprises a local clock oscillator 33 and an envelope detector 34 connected to the output of the input amplifier 18 whose output signals are compared in a phase detector 35 for the purpose of generating a phase control signal which controls the local clock oscillator 33 through a lowpass filter 36. The local clock signal which is applied through a lead 37 to the integrators 25, 26 and pulse regenerators 27, 28 is derived from the local clock oscillator 33.

For the local carrier recovery the co-transmitted pilot signals of 370 and 3,230 Hz are selected in pilot filters 38, 39 in the form of phase control loops and, mixed in a subsequent mixer stage 40 having an output filter 41. The sum frequency of 3,600 Hz is selected in the output filter 41 for generating the local carrier oscillation of 1,800 Hz having a rectangular signal shape. To this end the output signal from the output filter 41 is applied as a synchronizing signal to a pulse generator 42 and is applied through a phase control circuit 43 to be described hereinafter as a demodulation carrier directly and through a 90° phase-shifting network 44 to the modulators 22, 23 after frequency division by a division factor of 2.

In the system described demodulation of the received phase-modulated oscillations occurs under the influence of the local carriers. Particularly in the vector diagram of FIG. 3b the received phase-modulated oscillations are represented according to direction and size by the vectors OT, OU, OV and OW likewise as in the vector diagram of FIG. 3*a*. Due to the demodulation process at the outputs of the modulators 22, 23 output signals are then produced through integrators 25, 26 which are given by the projection of the vectors OT, OU, OV and OW on the carrier vectors, which outputs signals exactly correspond to the pulse signals transmitted by the transmission channels 1, 2 in case of the correct phase position of the local carrier signals. In case of the correct phase position of the local carrier signals given by the vectors OX and OY output signals are derived from the outputs of the modulators, which signals correspond accurately to the signals OP, OQ and OR, OS, respectively, in the transmission channels.

The vector diagram will also illustrate the effects which are caused by a phase deviation of the local carriers relative to the correct phase positions OX and OY. If the local carriers occupy the position OX′, OY′ due to a phase deviation $\phi$, the output signals from the modulators 22, 23 will no longer be given by the vectors OP, OQ, OR and OS but due to the then occurring crosstalk between the receiver channels 20, 21 they will have deviating values OP′, OP″; OQ′, OQ″, OR′, OR″; OS′, OS″ which result in a reduction of the pulse resolution in the pulse regenerator 27, 28.

If the local carriers exhibit a phase error of 180° due to a phase uncertainty in the system for carrier recovery and thus occupy the positions OX″, OY″ in the vector diagram a signal inversion will occur in case of demodulation in the demodulators 22, 23, that is to say, the +1 or −1 signal transmitted in one of the transmission channels 1, 2 will be reproduced in the receiver channels 20, 21 as a −1 or +1 signal.

According to the invention the local carriers are recovered under all circumstances in the correct phase position in case of a sensitive phase control because the synchronizing interval having a duration of at least one clock interval is reserved at the transmitter end for phase stabization in the rhythm of a periodic cycle period corresponding to an integral number of clock intervals while a synchronizing signal generator 45 is connected to the modulator 3 in the first transmission channel 1, which generator applies a predetermined pulse signal as a synchronizing signal during the synchronizing intervals to the input of the modulator 3 incorporated in this channel 1, an interruptor switch 46 being incorporated in the second of the two transmission channels 1, 2 which switch interrupts the second transmission channel 2 at the instants of the synchronizing intervals.

To this end the transmission channels 1, 2 in the transmitter shown are fed by the output signals from shift registers 47, 48 having eleven shift register elements whose contents are shifted in the rhythm of the clock frequency of the pulse signals of 110 Hz to be transmitted during a cycle period T corresponding to eleven clock periods of 1/110 sec. Whenever a cycle period T commences the pulse signals from information pulse sources 51, 52 are written in through shift registers 53, 54 having the ten shift register elements in the shift register elements of the shift registers 47, 48 while using the intermediate stores 49, 50 controlled by the cycle frequency. For the phase synchronization a +1 signal of the synchronizing signal generator 45 is applied to the shift register element 55 of the shift register 47. For example, the synchronizing signal generator 45 in the given embodiment is constituted by providing the intermediate store 49 with an additional storage element 56 and by connecting a suitable direct voltage source 57 thereto.

During the next cycle period of one-tenth sec the shift of the contents of the eleven shift register elements of the shift registers 47, 48 is effected and simultaneous therewith the shift of ten pulse signals from the information pulse sources 51, 52 in the shift register elements of the shift registers 53, 54 under the control of the clock pulse generator 58 associated with these pulse signals while after termination of the cylce period the above given cycle is repeated. The frequency of the clock pulse generator 58 is in this case equal to ten-elevenths of that of the transmitted pulse signals, that is to say, a frequency of $10/11 \times 110$ Hz $= 100$ Hz.

All frequencies for the control of the transmitter are derived from the clock pulse generator 58 of 100 Hz, for the cycle frequency of 10 Hz for controlling the intermediate stores 49, 50 is obtained by frequency division by a division factor of 10 in a frequency divider 59 and the clock frequency of 110 Hz for controlling the shift registers 47, 48 is obtained by frequency multiplication in a subsequent frequency multiplier 60 having a factor of 11. The output signals from the frequency divider 59 and the frequency multiplier 60 are also applied to a switching signal generator 61 for generating a switching signal for the interruptor switch 46 in the transmission channel 2 and the output signal from the frequency multiplier 60 is applied as a synchronizing signal to the envelope signal generator 13.

In the system described so far the transmission of the signals of the shift registers 47, 48 is effected through the two transmission channels 1, 2 during the subsequent clock intervals of one one hundred-tenth sec while every time the first clock interval of a cycle period of one-tenth sec is reserved as a synchronizing signal interval. As compared with the information pulse transmission in which the two transmission channels 1, 2 are simultaneously operative, the synchronizing signal transmission during the first clock interval of a cycle period is distinguished in that the transmission channel 2 is rendered inactive by the interruptor switch 46 and that always a +1 signal is transmitted in the transmission channel 1.

Figure 4A:
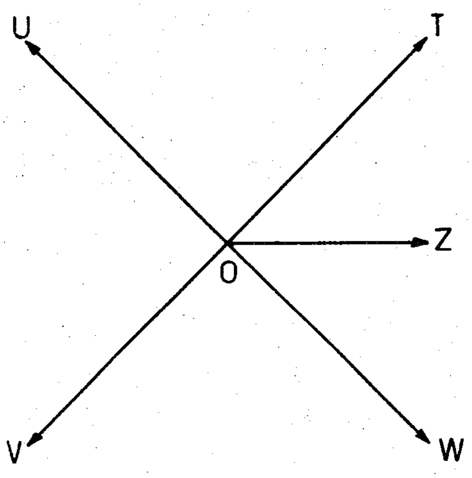

The differences in the transmission of the synchronizing signal and the information pulses from the information pulse sources become uniformly manifest in the vector diagram of the transmitted signals. Likewise as in the vector diagram of FIG. 3*a* the vectors OT, OU, OV and OW in the vector diagram of FIG. 4*a* show the transmitted information pulse signal according to direction and magnitude after combination in the combination device 9 and in that case the synchronizing signal is shown by the vector OZ. On the one hand the synchronizing signal vector OZ is distinguished from the vectors OT, OU, OV, OW by its phase location while on the other hand the synchronizing signal vector OZ has a magnitude which is a factor of $\sqrt{2}$ smaller than the vectors OT, OU, OV and OW.

Both distinct characteristics in the transmission of the synchronizing signal relative to the transmission of information pulses make it possible that the local carrier signals at the receiver end are always recovered in the correct phase in the arrangement for local carrier recovery 32 without a risk of phase uncertainty and with a sensitive phase control as will now be described in detail with reference to the receiver shown in FIG. 2.

According to the invention the arrangement for local carrier recovery 32 has at the receiver end a phase stabilization channel 62 connected to the output of the modulator 23 in the receiver channel 21 corresponding to the second transmission channel 2, with stabilization channel is provided with a blocking arrangement 63 incorporated therein which for the purpose of phase stabilization is released by a switching signal at the synchronizing intervals originating from a synchronizing interval selector 64 which for the purpose of selecting the synchronizing intervals of a lower signal level is fed by the received phase-modulated oscillations.

In the given embodiment of the synchronizing interval selector 64 the output signals from the input amplifier 18 are applied to the cascade arrangement of an amplitude detector 65, an integrator 67 controlled through lead 66 by clock pulses and a hold circuit 68 for storing the integrated signal value during a clock interval, while for selecting the synchronizing intervals of a lower signal level occurring with the cycle frequency the output signal from the hold circuit 68 is applied as a control signal to a phase control loop 69 which brings the cycle frequency generated by frequency division in a frequency divider 70 from the clock pulses of the local clock pulse oscillator 33 in phase with the synchronizing intervals in the output signal of the hold circuit 68. The phase control loop 69 thus operates as an amplitude filter.

The phase control loop 69 used is of a known type (compare, for example, "Data Transmission," Benneth and Davey, 1965, page 261) so that only the elements will be referred to in this description. Particularly the phase control loop 69 includes a phase detector 71 which is connected to the outputs of the hold circuit 68 and the phase control loop 69, a low-pass filter 72 and a comparator 73 for controlling a phase control arrangement 74 constituted by a frequency multiplier 75 connected to the frequency divider 70, followed by two parallel branches 76, 77 which are each provided with electronic switches 78, 79 controlled by the comparator 73 and with an inverter 80 in the branch 77, the outputs of the parallel branches 76, 77 being connected through a combination device 81 to a frequency divider 82 which constitutes the output of the phase control loop. The division factor of the frequency divider 82 is rendered equal to the multiplication factor of the frequency multiplier 75.

In the non-stabilized state the phase of the output signal is continuously varied in the described phase control loop 69 by applying or suppressing every time a pulse from the pulse series applied to the frequency divider 82 by means of the switches 78, 79 controlled through the comparator 73 and this is done until phase conformity is achieved between the output signal from the frequency divider 82 and the synchronizing intervals in the output signal from the hold circuit 68 in the stabilized state whereafter the phase control lamp 69 is retained in its stabilized state.

Thus output pulses are derived from the hold circuit 68 at the output of the frequency divider 82 in phase conformity with synchronizing intervals in the output signal occurring with the cylce frequency. These output pulses release, as switching pulses, the blocking arrangement 63 in the phase stabilization channel 62 of the arrangement for local carrier recovery 32 through an AND-gate 83 controlled by the clock pulses of the local clock pulse oscillator 33. More particularly the blocking arrangement 63 is constituted by a normally blocked comparator for the control of a phase control arrangement 84 in a phase control loop of the kind as the afore-described phase control loop 69 in the synchronizing interval selector 64.

Likewise as in the described phase control loop 69 in the synchronizing interval selector 64 the relevant phase control loop includes a phase detector which in this case is constituted by the modulator 23 in the receiver channel 21 whose output signal is applied as a phase control signal through the integrator 26 to the comparator 63, while also the phase control circuit 84 is formed in the same manner and particularly the phase control circuit 84 includes a frequency multiplier 85 followed by two parallel branches 86, 87 each provided with electronic switches 88, 89 controlled by the comparator 63 and also with an inverter 90 in the branch 87, the parallel branches 86, 87 being connected through a combination device 91 to a frequency divider 92. Since the pulse oscillator synchronized by the sum frequency of the two pilot signals of 370 and 3,230 Hz has a frequency of 3,600 Hz and the local carrier frequency is to be equal to 1,800 Hz, the division factor of the frequency divider 92 is twice as large as the multiplication factor of the frequency multiplier 95.

In the system described a control voltage is generated by modulation of the local carrier and the received phase-modulated oscillations in the modulator 23 through integrator 26 of the receiver channel 21 corresponding to the second transmission channel 2 at the instants of the synchronizing intervals, that is to say at the instants of reception of a synchronizing signal originating from the first transmission channel 1. This control voltage controls the electronic switches 88, 89 in the phase control arrangement 84 through the comparator 63 for the purpose of phase stabilization of the locally generated carrier oscillation. In fact, it is found that the control voltage generated by modulation in the modulator 23 in the receiver channel 21 exactly characterizes in magnitude and polarity the mutual phase difference between the local carrier and the carrier from the transmission carrier oscillator 8. Whenever a synchronizing interval occurs the comparator 63 is released by a switching pulse from the AND-gate 83 while by addition or suppression of a pulse with the aid of the electronic switches 88, 89 the phase of the local carrier is readjusted according to magnitude and polarity of the phase control voltage for such a period until the desired phase conformity of the local carrier and the transmission carrier is achieved. Particularly in the given arrangement, starting from the illustrated position of the electronic switches 88, 89 a pulse will be suppressed by opening the switch 88 every time at the instants of release of the comparator 63 in case of phase leading of the local carrier and a pulse will be added by closing the switch 89 in case of phase lagging.

Figure 4B:
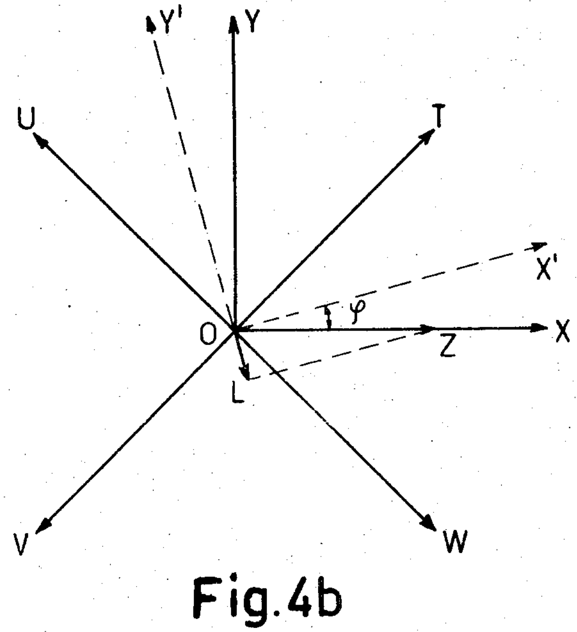

To explain the operation of the system described so far FIG. 4*b* shows a vector diagram in which likewise as in the vector diagram of FIG. 4*a* the vectors OT, OU, OV and OW illustrate the information pulse signals according to direction and size and OZ illustrates the synchronizing signal vector at the instants of the synchronizing intervals, while the vectors OX and OY represent the local carriers which occur in the correct phase position at the modulators 22 and 23, respectively.

If the local carriers occupy the position shown by the vectors OX and OY no phase control of the locally generated carriers will occur in the phase control loop 43 because then the local carrier OY is at right angles to the synchronizing signal vector OZ at the instants of the synchronizing intervals in the modulator 23 in the receiver channel 21 and consequently no control voltage is generated in the modulator 23 through integrator 26. However, if the local carriers exhibit a phase deviation relative to the position OX, OY, a phase control occurs in the phase control loop 43 because then a control voltage is generated in the modulator 23 as a result of the mutual crosstalk between the receiver channels 20, 21. The polarity and the magnitude of this control voltage are determined by the polarity and magnitude of the occurring phase deviation. For example, when in FIG. 4*b* the local carriers occupy a position OX′, OY′ given by the phase deviation $\phi$, a phase control voltage OL having a negative polarity is generated in the integrator 26 in the output of the modulator 23 and having a magnitude OZ sin $\phi$ given by the projection of the synchronizing signal vector OZ on the carrier vector OY′ which control voltage brings the phase control loop 43 to its stable final position characterized by the position OX, OY of the local carriers.

Without the risk of the phase uncertainties in the arrangement for local carrier recovery 32 it is always ensured that in case of sensitive phase control the local carriers for the receiver channels 20, 23 are accurately in phase conformity with the carriers in the corresponding transmission channels 1, 2. Thus it is achieved in the given arrangements that in the pulse regenerators 27, 28 of the receiver channels 20, 21 an accurate reproduction is realized of the information pulse current transmitted through the transmission channel 1, 2 which is periodically interrupted in the rhythm of the cycle period by the synchronizing signal interval. For example in the given embodiment ten clock intervals of one one hundred-tenths sec are utilized during each cycle period of one-tenth sec for the information pulses and one clock interval is utilized for synchronization.

When in the described arrangement the information pulses from the information pulse sources 51, 52 is to be recovered with the clock frequency of 100 Hz without the interruption of the pulse current, this object may be realized in a manner analogous to that in the transmitter. More particularly each pulse regenerator 27, 28 in the receiver channels 20, 21 likewise as each of the users 29, 30 are connected to shift registors 93, 94 and 95, 96, respectively, the elements of the shift registers 93 and 95 and 94 and 96 being mutually coupled through intermediate stores 97, 98. When during each cycle period the 10 information pulses derived from the pulse regenerators 27, 28 are shifted in the rhythm of the associated clock frequency of 110 Hz in the shift registers 93, 94 including ten shift register elements and are subsequently written in through the intermediate stores 97, 98 in the shift register elements of the shift registers 95, 96, the information pulses from the information pulse sources 51, 52 are re-obtained from the shift registers 95, 96 by shifting the contents of the shift register elements of the shift registers 95, 96 with the clock frequency of 100 Hz associated with these information pulses. The shift frequencies of the shift registers 93, 94 and 95, 96 as well as the writting frequency for the intermediate stores 97, 98 are derived from the arrangement for local clock signal recovery 31 and the synchronizing signal interval selector 64, particularly the shift pulses of 110 Hz for the shift registers 93, 94 from the local clock pulse oscillator 33, the writing pulses of 10 Hz for the intermediate stores 97, 98 from the AND-gate 83 through a suitable delay element 99 and the shift pulses of 100 Hz for the shift registers 95, 96 from a frequency multiplier 100 connected to the AND-gate 83 and having a frequency multiplication factor of 10.

Improvements in the given system may be provided within the scope of the invention. Particularly the amplitude detector 65 in the synchronizing signal selector 64 may be advantageously formed as an amplitude detector having a quadratic detection characteristic because the level distinction between the information pulse intervals and the synchronizing signal intervals of a lower signal level is improved by 3 dB thereby. This improvement of the level distinction may alternatively be realized at the transmitter end by attenuating the synchronizing signal applied to the modulator 3 (compare FIG. 1), for example, by using an electronic switch 101 which under the control of the switching signal from the switching signal generator 61 every time applies the synchronizing signal through an attenuator 102 to the modulator 3 during the synchronizing interval.

In this respect it is to be noted that other embodiments of the described system are alternatively possible within the scope of the invention.

For the clock frequency recovery it is not only possible to modulate the envelope of the transmitted signals in a modulator 12 (compare FIG. 1) with envelope signal denoted by 14, but it is also possible to realize this envelope modulation by a suitable sub-harmonic of the clock frequency which in four-phase or eight-phase modulation without parallel transmission does not necessitate any extension of the transmission bandwidth. The clock signal is then recovered at the receiver end by using a suitable frequency multiplication after envelope detection. If necessary the clock signal recovery may be alternatively realized by using pilot frequencies or by using other known methods.

For the carrier recovery it is neither necessary to use two pilot frequencies, but a single pilot signal may be used for this purpose whose frequency is then a given multiple or fraction of the carrier frequency. The carrier recovery might even be realized without pilot frequencies by utilizing a sufficiently stable local carrier oscillator at the receiver end.

In addition the elements of the transmission system according to the invention may differ from those in the embodiment of FIGS. 1 and 2. For example, instead of using the amplitude filter in the form of a phase control loop for the synchronizing interval detection of the synchronizing intervals of a lower signal level it is alternatively possible to use amplitude filters of other known types.

What is claimed is:

1. A system of the type including a transmitter and a receiver for the transmission of binary pulse signals located in periodic intervals by means of phase modulation, comprising at the transmitter end a phase modulator provided with at least two parallel-arranged channels on an input side thereof, each channel incorporating a modulator, a combination device, and with a common carrier oscillator which feeds the two modulators with carrier oscillations which are mutually shifted 90° in phase, the outputs of the two modulators being combined in the combination device for transmission through a transmission path, while the receiver includes a phase demodulator which is provided with at least two parallel-arranged channels connected on the input side to the transmission path and each incorporating a modulator, and with an arrangement for local carrier recovery which is stabilized on the transmitter carrier oscillations for demodulation of the transmitted binary pulse signals and which feeds the two modulators with carrier oscillations which are mutually shifted 90° in phase, the pulse signals derived from each of the outputs of the two modulators being applied through a pulse regenerator to a user, the improvement wherein a synchronizing interval having a duration of at least one clock interval is reserved for phase stabilization in the rhythm of a periodic cycle period corresponding to an integral number of clock intervals, a synchronizing signal generator being connected at a transmitter end to the modulator in the first of the two transmission channels, said generator comprising means for applying a predetermined pulse signal as a synchronizing signal to the input of the modulator incorporated in said channel during the synchronizing intervals, the second of the two channels incorporating an interruptor switch means connected to said synchronizing signal generator for interrupting the second transmission channel at the instants of the synchronizing intervals, while in the receiver the arrangement for local carrier recovery comprises blocking arrangement means for selectively phase reversing the received carrier signal, a synchronizing interval selection means for selecting the synchronizing intervals of a lower signal level, a phase stabilization channel means for connecting the output of the modulator in the receiver channel corresponding to the second transmission channel to the blocking arrangment which for the purpose of phase stabilization is released by a switching signal at synchronizing intervals originating from the synchronizing interval selector means which is fed by the received phase-modulated oscillations.

2. A system as claimed in claim 1 in which each of the two transmission channels is fed by an information pulse source, further comprising an intermediate store wherein each of the transmission channels is connected to a shift register and to the information pulse sources, the shift registers being connected to the transmission channel and the information pulse source and being mutually coupled by means of one of the intermediate stores which in the rhythm of the periodic cycle period writes the contents of the shift register connected to the information pulse source in the shift register connected to the transmission channel the latter shift register having an additional shift register element to which the synchronizing signal generator is coupled, while both the shift register connected to the transmission channel and the shift register connected to the information pulse source is completely shifted during each cycle period.

3. A system as claimed in claim 2, wherein the synchronizing signal generator is constituted by providing the intermediate store with an additional storage element and by connecting a direct voltage source thereto.

4. A system as claimed in claim 1, wherein the interruptor switch in the second transmission channel is connected to a switching signal generator which is controlled by the cycle frequency and the clock frequency of the transmitted pulses.

5. A system as claimed in claim 1, wherein an electronic switch is incorporated between the shift register connected to the first transmission channel and the modulator incorporated in said channel, which switch is controlled by the same switching signal as that of the interruptor switch in the second transmission channel and applies a synchronizing signal through an attenuator to the said modulator in the first transmission channel.

6. A system as claimed in claim 1, wherein the synchronizing interval selector is constituted by an amplitude detector fed by the received pre-modulated oscillations and followed by a subsequent amplitude filter selecting the synchronizing intervals of a lower signal level.

7. A system as claimed in claim 6, wherein the amplitude detector in the synchronizing interval selector is constituted by an amplitude detector having a quadratic detection characteristic.

8. A system as claimed in claim 1, provided with an arrangement for local clock signal recovery, wherein the amplitude filter is constituted by a phase control loop, the recovered clock signals being applied to a phase control circuit while the selected clock signal intervals are derived from its output which intervals are compared in a phase detector with the output signal from the amplitude detector for generating a phase control signal which controls the phase control circuit through a comparator.

9. A system as claimed in claim 1, wherein the blocking circuit in the phase stabilization channel of the arrangement for local carrier recovery is constituted by a comparator which is also fed by the output signal from the modulator in the receiver channel corresponding to the second transmission channel for the purpose of controlling a phase control circuit to whose input a locally generated carrier is applied and whose output is connected to the modulators in the two receiver channels.

10. A system as claimed in claim 1, provided with an arrangement for local clock signal recovery, wherein the switching signal for the blocking arrangement in the phase stabilization channel of the arrangement for local carrier recovery is derived from an AND-gate which is fed by the output signals from the synchronizing interval selector as well as from the arrangement for local clock signal recovery.

11. An arrangement as claimed in claim 1, wherein the pulse regenerators as well as the users in each of the two receiver channels are connected to a shift register and that said shift registers are mutually coupled by means of an intermediate store which in the rhythm of the switching pulses derived from the synchronizing interval selector write the contents of the shift register connected to the pulse regenerator in the register connected to the user, while the contents of the shift register connected to the pulse regenerator are shifted by the clock signals from an arrangement for local clock signal recovery and the contents of the shift register connected to the user are shifted by clock pulses corresponding to the clock pulses of the information pulses at the transmitter end.

12. A system as claimed in claim 1, adapted for parallel transmission, wherein the phase-modulated output signals are modulated in a modulator by an envelope signal having sinusoidal transitions of clock frequency, while for the local clock signal recovery at the receiver end a local clock oscillator is incorporated in a phase control loop which oscillator is synchronized by the detected envelope signal.

* * * * *